Patented May 5, 1942

2,281,758

UNITED STATES PATENT OFFICE 2,281,758

DRY REAGENT FOR TESTING

Alexander Galat, Bronx, N. Y., assignor to The Denver Chemical Manufacturing Company, New York, N. Y., a corporation of Colorado No Drawing. Application January 31, 1940, Serial No. 316,515. In Great Britain January 31, 1939

3 Claims. (Cl. 252—408)

This invention is a dry reagent for the direct and immediate testing, without external heating, for sugar, of bodily and other solutions, as blood and urine, particularly the latter. The ingredients in dry crystalline or powder form are mixed dry and in any order and the product is dry. It is in powder or tablet form ready, without heat other than that of the heat of solution of the caustic alkali described below as one of the reagent ingredients, said heat of solution initiating an exothermic reaction when a drop of the solution falls upon the reagent, to give the test at once.

The reagent of this application is related to the reagent of my copending application, Serial No. 162,385, filed September 3, 1937, now Patent No. 2,210,579, August 6, 1940, to which reagent also the next preceding paragraph is applicable. Common features and the historic background are set forth in the said patent to which reference may be had for further particulars not repeated here, the instant application being in part continuing with the said patent application, though being also a convention application based on applicant's British application filed January 31, 1939, now Patent No. 524,426 granted October 31, 1940.

In both reagents, a dry mixture of an anhydrous bismuth salt, as bismuth oxychloride and caustic alkali, as sodium hydroxide, gives a black color, due to the reduction of the bismuth salt, with a solution of dextrose, the heat evolved in the moistened powder by the reaction of sodium hydroxide and water being sufficient without external heating necessary in the well-known Nylander wet test.

In the reagent of my said copending application this test reaction is speeded up and the test indication given sharp clarity by the addition of soluble silicate, as sodium silicate or potassium silicate, having capillary structure which on the instant flashes throughout the reagent the drop of liquid to be tested. The silicate also has protective effect against premature reaction of the caustic alkali and tends to stabilize the mixture. To increase stability and to further minimize advance action of the caustic alkali and decrease the hygroscopic character of the mixture, compounds of lead and/or compounds of magnesium which have been found to have that effect are added in minute proportions, as .05% by weight of each, this being found sufficient, or in larger amounts. The solubility of the sodium silicate promotes the permeating action referred to and increases the sharpness of the test.

The reagent of the instant application differs from that of my said copending application in the substitution for the sodium silicate of a water-free magnesium containing silicate having capillary structure, and which, contrary to expectation, has been found not to be disqualified for such use by its insolubility, notwithstanding its presence in the reagent in large amount, and which being a magnesium compound makes superfluous the addition to the reagent of a lead compound and/or another magnesium compound, in minute or other proportions, to stabilize the reagent or reduce its hygroscopic character—all as will hereinafter more fully appear in the detailed description of the instant reagent following further explanation of the reagent of my said copending U. S. patent.

The bismuth compounds selected for use both in the reagent of my copending application and in that of the present application are anhydrous compounds of bismuth which do not have water associated with them either as water of constitution or as water of crystallization and which I describe as water-free and which do not yield water even when heated. The best such compound for this purpose is bismuth oxychloride, BiOCl, which in making the test is changed to a fresh and therefore active oxide of bismuth, probably $Bi_2O_3$, which is readily reduced by sugar in the urine (or other solution) to metallic bismuth or other bismuth indication. In order to be quickly and easily reduced to black metallic bismuth, the bismuth oxide must be as freshly prepared as possible, ideally at the instant of performing the test. Oxychloride of bismuth and other anhydrous bismuth salts, as bismuth sulphate, borate, and phosphate act in this way producing a fresh and highly reactive oxide, the reducing action of the sugar being much more energetic under these conditions, this enhanced reactivity and reducibility being a common property of metallic oxides at the moment of their formation.

The silicates named in my said U. S. patent, sodium silicate and potassium silicate, both have capillary structure. By capillary structure is means that the ingredient is characterized throughout its mass by a multiplicity of capillaries, i. e., capillary pores, canals or crevices. The action is understood to be by interfacial tension. Both the dry silicates named may be obtained in the open market. In addition to making the powder less hygroscopic and tending to stabilize it, as explained in said U. S. patent, each acts in two other ways. (1) It is a reactionaccelerator. It distributes the solution in making the test, i. e., having capillary structure it enables the small drop of solution (urine or etc.), by which it is capable of being wet, to penetrate immediately by a multiplicity of paths the entire mass of the small portion of powder used in the test (about 0.2 of a gram) permeating on the instant every particle and thus carrying out the reaction at the same time in every part of the mass, thereby attaining in the least time the highest temperature that can be obtained with a given amount of powder, and (2) giving the sharpest definition in the test indication as well as the quickest.

In performing function 1 the ingredient overcomes, by virtue of its capillary structure, the fundamental difficulty inherent in the simple bismuth compound-caustic soda mixture due to insolubility of the bismuth compound and of reaction products. Both bismuth hydroxide and bismuth oxide formed when the powder being hygroscopic is moist, as well as in the test reaction itself, are not capillary in their structure and are insoluble as well and so present a sort of wall or insulation localizing the reaction by delaying or preventing progress of the moisture of the solution to the non-proximate particles of the powder, thereby reducing the extent of the reaction, the promptness of it and the amount and speed of heat production frequently below the point essential to the test, so that a negative result is meaningless and the reagent cannot be relied on.

The instability and excessive hygroscopic character of dry mixtures of a bismuth compound and caustic alkali, their sensitiveness to air, light, moisture, dust, change of temperature, etc., is known, and the vital importance of removing or minimizing these serious defects is understood, as appears in full in the said U. S. patent, wherein the effectiveness of lead compounds and/or magnesium compounds even in minute proportions, as .05% by weight of the mixture, in counteracting these defects, is set forth and also the manner in which by many experiments the value of compounds of each of the metals named was ascertained. Magnesium oxide and magnesium carbonate, both being light, voluminous and flocculent are listed as the best magnesium compounds for this purpose then known, along with magnesium nitrate and magnesium sulphate, also successfully used, and the belief is expressed, based on the applicant's investigations over a long period that any other compound of magnesium would so far possess the requisite characteristics as to serve the purpose.

The magnesium-containing silicates which, in the instant reagent, replace the sodium silicate and stabilizers have capillary structure as described in connection with the soluble silicates. They are water-free and, though insoluble, do not retard or obscure the test sufficiently to bar their use as a practical matter. Their tendency in this direction is slight and leaves the reagent commercially practicable. The voluminous flocculent character of the magnesium-containing silicate, together with its capillary structure, enables it to function unexpectedly well in the test, and its heat-protecting or insulating character is believed to be a factor in maintaining the heat of the test reaction at the high point required for a quick, clear test. It was found, furthermore, to have so great a stabilizing effect upon the mixture that the addition of a lead compound and/or another magnesium compound was superfluous. Indeed as a preservative and stabilizer of the reagent mixture it is markedly superior to sodium silicate in its protective effect and, in particular, protects against premature reaction of the reagent due to moisture of the air, thereby precluding decrease of the calorific power of the reagent in advance of the test below that essential to the test.

Magnesium-containing silicates which are not anhydrous, as serpentine, talc and meerschaum, must be discarded, but dry anhydrous asbestos powder, which is an anhydrous magnesium silicate containing substance neutral in color as respects the test is suitable. It is on the market as a fine white powder of a capillary structure and has been found to be effective. Since this ingredient is used in relatively large amount, it is important that it be neutral in color. It is compatible with the reaction or reactions which the test involves and substantially inert to the other materials of the mixture in its substantially dry state. This means that the material is not an oxidizing agent, or a reducing agent or acidic in character.

The relative amounts in which the principal ingredients are to be used is dictated in a general way by the nature of the ingredients and by the task to be performed. The percentages of the respective materials will be varied according to the solution to be tested, the amount of sugar, if any, normally in the solution and like factors. For testing urine, the powder reagent is made up to be sensitive to not less than about 0.1%. This is sufficiently sensitive for the sugar test, but not so sensitive as to give the black sugar test indication immediately in response to non-sugar constituents having reducing power. Putting in more of the bismuth salt, which is not capillary in structure, and which, being insoluble, tends to cover the black in the test, makes the reagent less sensitive, as is necessary in testing blood which normally has approximately 0.1% of sugar, so that the reagent, in this case, should not respond to so little as 0.1% of sugar. It will be apparent that in compounding the reagent account must always be taken of the insolubility and non-capillary character of the bismuth compound, which, if present in undue amount, tends to cover the black particles of the free bismuth and so obscure the test. Account must also be taken of the amount of any other insoluble ingredient, and the total insoluble content of the reagent must be kept below the point at which it would obscure the test indication to an extent not permissible for the particular solution to be tested. Whether or not specified in the particular claims, it is to be understood, also, that materials which by their color and amount would obscure the test are excluded.

Proportions by weight which I have found in actual practice to be effective in the dry reagent for a sugar test of urine are as follows: bismuth salt (bismuth oxychloride) 12.5%; caustic soda 56.5%; and the balance anhydrous magnesium-containing silicate. Testing reagent of this composition and proportions is still fully effective and reliable many months after it was made up. It is to be understood that the proportions just given, while suggestive and while indorsed by experience are approximate and are not to be taken as invariable, but are to be modified according to the nature of the particular solution to be tested and other special circumstances as will be apparent to a chemist. The ingredients are most readily mixed in the form of powder and in any order. None of the ingredients is wet; all are dry and not too coarse in the case of the silicate or capillary ingredient to have a capillary action, and not too coarse to lose the power to counteract hygroscopic characteristic of the mixture. No difficult is experienced on this score, however, since dry magnesium silicate on sale in the open market has capillary structure and is suitable for applicant's purpose. Compacted into tablets the reagent is less sensitive, and its use as a powder is as a rule preferred.

In making the urine test the reagent (about .2 of a gram), when moistened with a drop of urine, acts at once, in less than a half minute, ordinarily in less than 15 seconds. The test is fast enough to exclude errors due to dark color produced by ingredients other than sugar, since such discoloration does not occur until after five or ten minutes. The reaction is clear, giving under 0.1% of sugar only a slight gray color, whereas with 0.2% a strong black color which never fails to appear and which is recognized without difficulty or possibility of error is developed. The reagent is stable and would not give any yellow, gray or black coloration, other than the test.

I claim:

1. A dry reagent for direct flameless testing of urine for sugar by reaction with the sugar comprising a mixture of particles of an anhydrous bismuth salt, caustic alkali in sufficient amount on entering solution on contact with the test sample to furnish the heat required for the test, and a relatively large amount of a water-free magnesium containing silicate having capillary structure and neutral in color, said dry reagent when moistened by the test solution initiating an exothermic reaction whereby all the heat necessary for the test is supplied.

2. A dry reagent for drop contact flameless testing of solutions for sugar by reaction with the sugar, having within itself the power to supply in the test, when moistened by the solution being tested, all the heat required for the test, said dry reagent comprising a mixture of particles of an anhydrous bismuth salt, caustic alkali in sufficient amount on entering solution on contact with the test sample to furnish the heat required for the test, and a relatively large amount of water-free asbestos powder having capillary structure and neutral in color.

3. A dry reagent for direct testing of solutions for sugar, comprising a mass of dry-mixed particles of each of the following, an anhydrous bismuth salt, caustic alkali sufficient in amount on entering solution on contact with the test sample to furnish the heat required to complete the test reaction, and a relatively large amount of an anhydrous magnesium containing silicate having capillary structure and neutral in color as respects the test.

ALEXANDER GALAT.